(12) United States Patent
Ichida et al.

(10) Patent No.: US 11,059,543 B2
(45) Date of Patent: Jul. 13, 2021

(54) BICYCLE DRIVE UNIT AND BICYCLE DRIVE SYSTEM INCLUDING BICYCLE DRIVE UNIT

(71) Applicant: Shimano Inc., Osaka (JP)

(72) Inventors: Tadashi Ichida, Osaka (JP); Satoshi Shahana, Osaka (JP); Kazuhiro Fujii, Osaka (JP); Kazuhiro Takeda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/838,490

(22) Filed: Dec. 12, 2017

(65) Prior Publication Data

US 2018/0178883 A1 Jun. 28, 2018

(30) Foreign Application Priority Data

Dec. 26, 2016 (JP) .............................. JP2016-252051

(51) Int. Cl.
| | |
|---|---|
| *B62M 25/08* | (2006.01) |
| *B62M 6/55* | (2010.01) |
| *B62M 6/45* | (2010.01) |
| *F16C 1/12* | (2006.01) |
| *F16C 1/26* | (2006.01) |
| *B62J 1/08* | (2006.01) |

(Continued)

(52) U.S. Cl.
CPC ............... *B62M 25/08* (2013.01); *B62J 1/08* (2013.01); *B62J 99/00* (2013.01); *B62K 23/02* (2013.01); *B62K 25/04* (2013.01); *B62L 3/00* (2013.01); *B62M 6/45* (2013.01); *B62M 6/55* (2013.01); *B62M 6/80* (2013.01); *F16C 1/12* (2013.01); *F16C 1/26* (2013.01); *B62J 45/20* (2020.02); *B62J 2001/085* (2013.01); *B62K 2025/048* (2013.01)

(58) Field of Classification Search
CPC . B62M 6/55; B62M 6/60; B62M 6/65; B62M 6/70; B62M 6/75; B62M 6/45; B62M 6/50; B62M 25/08; B62M 9/127; B62M 9/122; B62M 9/123; B62M 9/1242; B62M 9/125; B62M 9/137; B62M 9/132; B62M 9/133; B62M 9/1342; B62M 9/135; Y10T 74/20444
See application file for complete search history.

(56) References Cited

U.S. PATENT DOCUMENTS

| | | | |
|---|---|---|---|
| 5,356,348 A | 10/1994 | Bellio et al. | |
| 5,470,277 A * | 11/1995 | Romano | ................ B62M 9/122 474/110 |

(Continued)

FOREIGN PATENT DOCUMENTS

| | | |
|---|---|---|
| CN | 1696009 A | 11/2005 |
| CN | 104943814 A | 9/2015 |

(Continued)

OTHER PUBLICATIONS

JPO Translation of JP 10194186 A, Makino, Jul. 28, 1998 (Year: 2019).*

*Primary Examiner* — Daniel D Yabut
(74) *Attorney, Agent, or Firm* — Global IP Counselors, LLP

(57) ABSTRACT

A bicycle drive unit includes a motor that assists propulsion of a bicycle and a wire operation device that operates a wire, which is connectable to a bicycle component.

25 Claims, 8 Drawing Sheets

(51) Int. Cl.
    *B62K 25/04*     (2006.01)
    *B62K 23/02*     (2006.01)
    *B62L 3/00*     (2006.01)
    *B62M 6/80*     (2010.01)
    *B62J 99/00*     (2020.01)
    *B62J 45/20*     (2020.01)

(56) References Cited

U.S. PATENT DOCUMENTS

| | | |
|---|---|---|
| 5,538,477 A | 7/1996 | Bellio et al. |
| 5,569,104 A | 10/1996 | Bellio et al. |
| 5,571,056 A | 11/1996 | Gilbert |
| 7,148,582 B2 * | 12/2006 | Matsueda ............... B62M 11/16 |
| | | 290/1 C |
| 8,186,244 B2 * | 5/2012 | Matsumoto ............. B62M 6/55 |
| | | 74/606 R |
| 2003/0092519 A1 * | 5/2003 | Fukuda ................ B62M 9/122 |
| | | 474/70 |
| 2005/0253356 A1 | 11/2005 | Matsueda et al. |
| 2012/0283057 A1 | 11/2012 | Lee et al. |
| 2013/0054067 A1 * | 2/2013 | Shoge .................... B62M 6/45 |
| | | 701/22 |
| 2014/0210318 A1 * | 7/2014 | Yao ........................ B62K 19/34 |
| | | 310/67 R |
| 2016/0101826 A1 * | 4/2016 | Watarai ................. B62M 9/135 |
| | | 180/206.4 |
| 2016/0107721 A1 * | 4/2016 | Urabe .................... B62M 6/55 |
| | | 475/4 |
| 2017/0073040 A1 | 3/2017 | Djakovic et al. |

FOREIGN PATENT DOCUMENTS

| | | | | |
|---|---|---|---|---|
| CN | 105398538 A | | 3/2016 | |
| JP | 64-9896 U | | 1/1989 | |
| JP | 9-240568 A | | 9/1997 | |
| JP | 10194186 A | * | 7/1998 | ............. B62M 6/55 |
| JP | 2000-38187 A | | 2/2000 | |
| JP | 3423285 B2 | | 7/2003 | |
| JP | 3423288 B2 | | 7/2003 | |
| JP | 2005-324648 A | | 11/2005 | |
| JP | 2015-209159 A | | 11/2015 | |
| KR | 2004-0032735 A | | 4/2004 | |
| WO | 2015169313 A1 | | 11/2015 | |

* cited by examiner

BICYCLE DRIVE UNIT AND BICYCLE DRIVE SYSTEM INCLUDING BICYCLE DRIVE UNIT

This application claims priority to Japanese Patent Application No. 2016-252051, filed on Dec. 26, 2016. The entire disclosure of Japanese Patent Application No. 2016-252051 is hereby incorporated herein by reference.

BACKGROUND

Field of the Invention

The present invention generally relates to bicycle drive unit and a bicycle drive system including a bicycle drive unit.

Background Information

Japanese Laid-Open Patent Publication No. 2015-209159 hereinafter referred to as Patent document 1) discloses a bicycle provided with a bicycle drive unit that includes an assist motor and a bicycle component that includes a motor.

SUMMARY

It has been discovered that the bicycle disclosed in Patent document 1 needs the bicycle component to be provided with a motor to actuate the bicycle component.

One object of the present invention is to provide a bicycle that includes a bicycle component operated by a wire with a bicycle drive unit and a bicycle drive system including the bicycle drive unit that can be used in a preferred manner.

In accordance with a first aspect of the present invention, a bicycle drive unit includes a motor configured to assist propulsion of a bicycle and a wire operation device configured to operate a wire, which is connectable to a bicycle component. With the bicycle drive unit according to the first aspect, a bicycle including a bicycle component operated by a wire is provided with the bicycle drive unit. This assists propulsion of the bicycle. In addition, the bicycle component can be operated with the wire operation device.

In accordance with a second aspect of the present invention, the bicycle drive unit according to the first aspect is configured so that the wire operation device includes a wire connection portion that is connectable to the wire and rotated to operate the wire. With the bicycle drive unit according to the second aspect, rotation of the wire connection portion winds or unwinds the wire.

In accordance with a third aspect of the present invention, the bicycle drive unit according to the first aspect is configured so that the wire operation device includes a wire connection portion that is connectable to the wire and moved in a predetermined direction to operate the wire. With the bicycle drive unit according to the third aspect, movement in the predetermined direction pulls or feeds the wire.

In accordance with a fourth aspect of the present invention, the bicycle drive unit according to any one of the first to third aspects further includes a housing configured to accommodate at least a portion of the motor. The wire operation device is provided on the housing. With the bicycle drive unit according to the fourth aspect, the wire operation device is supported by the housing.

In accordance with a fifth aspect of the present invention, the bicycle drive unit according to the fourth aspect is configured so that at least a portion of the wire operation device is accommodated in the housing. With the bicycle drive unit according to the fifth aspect, the collection of foreign matter such as mud is limited on the portion of the wire operation device accommodated in the housing.

In accordance with a sixth aspect of the present invention, a bicycle drive unit includes a motor configured to assist propulsion of a bicycle and an attachment portion to which a wire operation device is attachable. The wire operation device configured to operate a wire that is connectable to a bicycle component. With the bicycle drive unit according to the sixth aspect, a bicycle including a bicycle component operated by a wire is provided with the bicycle drive unit. This assists propulsion of the bicycle. In addition the bicycle component can be operated with the wire operation device. Further, in accordance with the objective of the user, if the wire operation device is not necessary, then the bicycle drive unit can be used without the wire operation device. If the wire operation device is necessary, then the wire operation device can be attached to an attachment portion to use the bicycle drive unit. This improves the convenience.

In accordance with a seventh aspect of the present invention, the bicycle drive unit according to the sixth aspect is configured so that the attachment portion is one of a plurality of attachment portions. With the bicycle drive unit according to the seventh aspect, a plurality of wire operation devices can be attached to the bicycle drive unit.

In accordance with an eighth aspect of the present invention, the bicycle drive unit according to the sixth or eighth aspect further includes a housing configured to accommodate at least a portion of the motor. The attachment portion is provided on the housing. With the bicycle drive unit according to the eighth aspect, the wire operation device is supported by the housing.

In accordance with a ninth aspect of the present invention, the bicycle drive unit according to the eighth aspect is configured so that the attachment portion is at least partially disposed at least one of inside and outside of the housing. With the bicycle drive unit according to the ninth aspect, if at least a portion of the attachment portion is located in the housing, then the collection of foreign matter such as mud is limited on the portion of the wire operation device accommodated in the housing. If at least a portion of the attachment portion is located outside the housing, then enlargement of the housing is limited.

In accordance with a tenth aspect of the present invention, the bicycle drive unit according to any one of the fourth, fifth, eighth, and ninth aspects further includes a guide that guides the wire and is provided on the housing. With the bicycle drive unit according to the tenth aspect, the guide guides the wire. This stabilizes the movement of the wire.

In accordance with a tenth aspect of the present invention, the bicycle drive unit according to the fourth aspect is configured so that the guide is one of a plurality of guides. With the bicycle drive unit according to the eleventh aspect, a plurality of wires can guided.

In accordance with a twelfth aspect of the present invention, the bicycle drive unit according to the tenth or eleventh aspect is configured so that the guide includes a groove provided on the housing. With the bicycle drive unit according to the twelfth aspect, the wire is fitted to the groove and guided. Thus, the wire can be guided by a simple structure.

In accordance with a thirteenth aspect of the present invention, the bicycle drive unit according to the tenth or eleventh aspect is configured so that the guide includes a roller that is rotatable relative to the housing. With the bicycle drive unit according to the thirteenth aspect, the wire is wound around the roller and guided. This efficiently moves the wire.

In accordance with a fourteenth aspect of the present invention, the bicycle drive unit according to any one of the fourth, fifth, and eighth to thirteenth aspects is configured so that the housing includes a frame connection portion that is connectable to a frame of the bicycle. With the bicycle drive unit according to the fourteenth aspect, the frame connection portion connects the bicycle drive unit to the frame of the bicycle. Further, by attaching the bicycle drive unit to the frame of the bicycle, the housing can be used to couple the wire operation device to the frame of the bicycle.

In accordance with a fifth aspect of the present invention, the bicycle drive unit according to any one of the fourth, fifth, and eighth to fourteenth aspects is configured so that the housing supports a crankshaft of the bicycle. With the bicycle drive unit according to the fifteenth aspect, the crankshaft of the bicycle can be supported by the housing.

In accordance with a sixteenth aspect of the present invention, the bicycle drive unit according to the fifteenth aspect is configured so that in a state in which the housing is provided on the bicycle, a wire connection portion of the wire operation device is located at a position separated from a center of the frame of the bicycle in a direction in which a crankshaft of the bicycle extends. With the bicycle drive unit according to the sixteenth aspect, the wire, which is connected to a bicycle component including a wire connection portion located at a position separated from the center of the frame of the bicycle in a direction in which a crankshaft of the bicycle extends, can easily be connected to the wire operation device.

In accordance with a seventeenth aspect of the present invention, the bicycle drive unit according to any one of the first to sixteenth aspect further includes a detector that detects movement of the wire. With the bicycle drive unit according to the seventeenth aspect, movement of the wire can be detected. This allows the wire to be accurately moved.

In accordance with an eighteenth aspect of the present invention, the bicycle drive unit according to any one of the first to seventeenth aspect further includes an electronic controller that controls the wire operation device. With the bicycle drive unit according to the eighteenth aspect, the wire can be moved by the electronic controller.

In accordance with a nineteenth aspect of the present invention, the bicycle drive unit according to the eighteenth aspect is configured so that the electronic controller is configured to control the motor. With the bicycle drive unit according to the nineteenth aspect, the wire operation device and the motor can be controlled by the same electronic controller.

In accordance with a twentieth aspect of the present invention, the bicycle drive unit according to the eighteenth or nineteenth aspect further includes a communication unit that is configured to communicate with at least one of an operation device that is operable by a rider and a sensor that detects a condition of the bicycle. The electronic controller is configured to control the wire operation device in accordance with information input to the communication unit. With the bicycle drive unit according to the twentieth aspect, the electronic controller can actuate the wire operation device in accordance with at least one of the operation of the operation device and the condition of the bicycle.

In accordance with a twenty-first aspect of the present invention, the bicycle drive unit according to the twentieth aspect is configured so that the communication unit is configured to communicate with the at least one of the operation device and the sensor through wireless connection. With the bicycle drive unit according to the twenty-first aspect, the wiring of the operation device or the sensor with the drive unit can be omitted. This simplifies the wiring of the bicycle.

In accordance with a twenty-second aspect of the present invention, the bicycle drive unit according to any one of the eighteenth to twenty-first aspect further includes a memory device. The memory device stores information related to a movement amount of the wire that is required to perform a predetermined action with the bicycle component, and the electronic controller is configured to change the information related to the movement amount of the wire stored in the memory device in accordance with an operation of an external device. With the bicycle drive unit according to the twenty-second aspect, the electronic controller properly controls the wire movement amount based on the information stored in the memory device even when the bicycle component operated by the wire operation device is changed or when a part of the bicycle related with the bicycle component is changed.

In accordance with a twenty-third aspect of the present invention, the bicycle drive unit according to any one of the eighteenth to twenty-second aspects is configured so that the electronic controller is configured to control the wire operation device to move the wire over a first movement amount in one of a first direction and a second direction that is opposite to the first direction, and the electronic controller is then configured to control the wire operation device to move the wire over a second movement amount, which is less than the first movement, in the other one of the first direction and the second direction. With the bicycle drive unit according to the twenty-third aspect, the wire operation device moves the wire over a first movement amount and then moves back the wire over a second movement amount. This allows the bicycle component to be shifted from a first state to a second state in two steps.

In accordance with a twenty-fourth aspect of the present invention, the bicycle drive unit according to any one of the eighteenth to twenty-second aspects is configured so that the electronic controller is configured to the wire operation device to move the wire over a third movement amount in one of a first direction and a second direction that is opposite to the first direction, and the electronic controller is then configured to controls the wire operation device to move the wire over a fourth movement amount in the one of the first direction and the second direction. With the bicycle drive unit according to the twenty-fourth aspect, the wire operation device moves the wire over the third movement amount and then further moves the wire over the fourth movement amount. This allows the bicycle component to be shifted from a first state to a second state in two steps.

In accordance with a twenty-fifth aspect of the present invention, the bicycle drive unit according to any one of the first to twenty-fourth aspects is configured so that the wire operation device includes an electric actuator that differs from the motor, and the wire operation device actuates the electric actuator to operate the wire. With the bicycle drive unit according to the twenty-fifth aspect, the bicycle component can be operated by the electric actuator that is dedicated to wire operation.

In accordance with a twenty-sixth aspect of the present invention, the bicycle drive unit according to any one of the first to twenty-fourth aspects is configured so that the wire operation device is configured to operate the wire using manual power input to a crank of the bicycle or output torque of the motor. With the bicycle drive unit according to the sixteenth aspect, the bicycle component can be operated without using the electric actuator that is dedicated to operating the wire.

In accordance with a twenty-seventh aspect of the present invention, a bicycle drive system includes a bicycle drive unit according to any one of the first to twenty-sixth aspects, the wire and the bicycle component. The bicycle component includes at least one of a shifting device, a seatpost assembly, a suspension, and a brake device. With the bicycle drive unit according to the twenty-seventh aspect, at least one of a shifting device, a seatpost assembly, a suspension, and a brake device can be operated by the wire operation device.

In accordance with a twenty-eighth aspect of the present invention, a bicycle drive unit includes a motor configured to assist propulsion of a bicycle and a guide configured to contact a wire, which is connectable to a bicycle component, and configured to guide movement of the wire. With the bicycle drive unit according to the twenty-eighth aspect, the guide guides the wire. This stabilizes the movement of the wire.

In a bicycle including a bicycle component operated by a wire, the bicycle drive unit and the bicycle drive system, which includes the bicycle drive unit according to the present invention, can be used in a preferred manner.

BRIEF DESCRIPTION OF THE DRAWINGS

Referring now to the attached drawings which form a part of this original disclosure.

DETAILED DESCRIPTION OF EMBODIMENTS

The following description illustrates various embodiments and is not intended to be restrictive. The embodiments can be modified. Further, two or more of the embodiments can be combined.

First Embodiment

Figure 1:
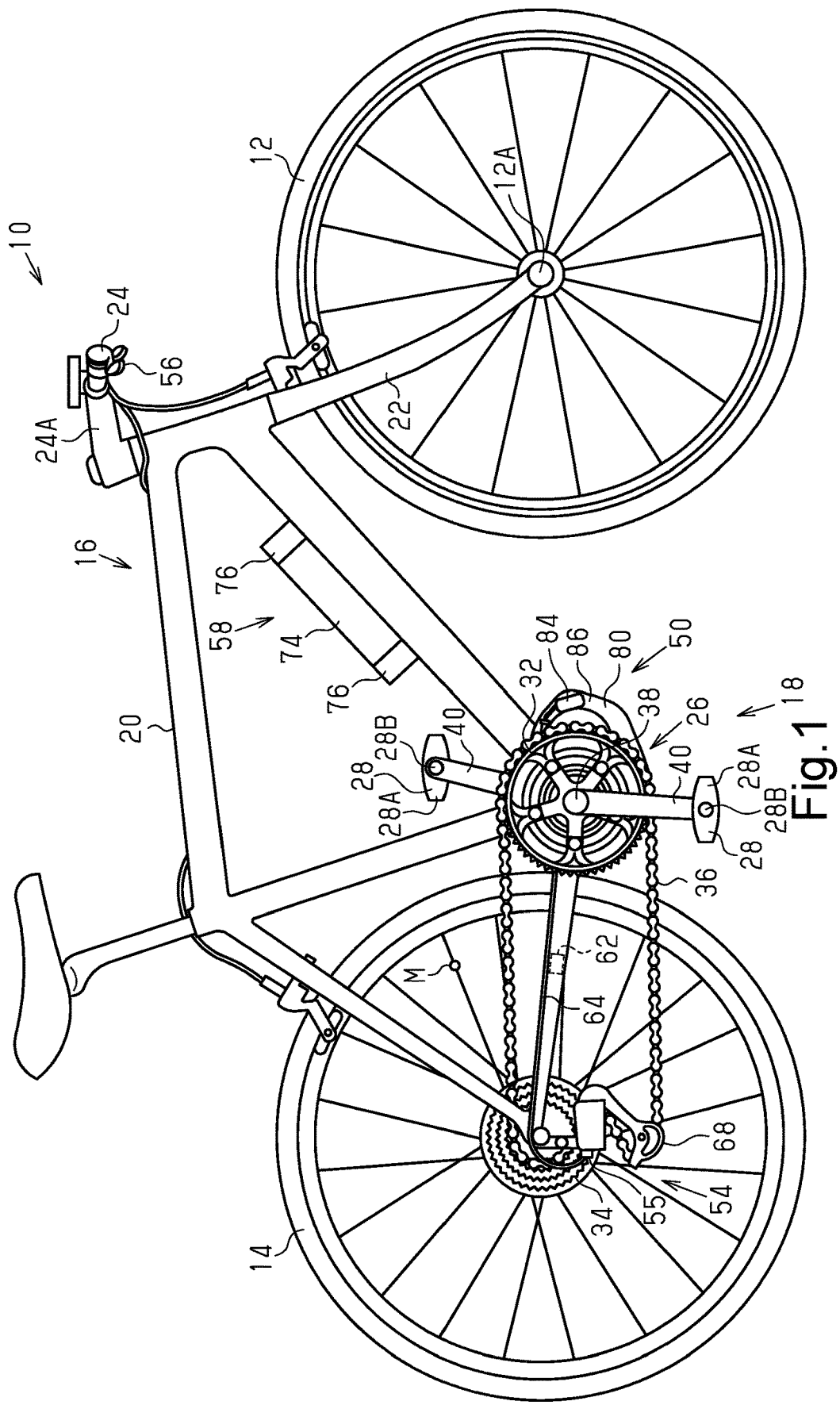
FIG. 1 is a side elevational view of a bicycle including a bicycle drive system in a first embodiment.

A bicycle 10 including a bicycle drive unit 80 and a bicycle drive system 50 in a first embodiment will now be described with reference to FIGS. 1 to 5. As shown in FIG. 1, the bicycle 10 includes a front wheel 12, a rear wheel 14, a bicycle body 16, a drive mechanism 18, and the bicycle drive system 50. The bicycle body 16 includes a frame 20, a front fork 22 connected to the frame 20, and a handlebar 24 connected in an attachable and removable to the front fork 22 by a stem 24A. The front fork 22 is supported by the frame 20 and connected to an axle 12A of the front wheel 12.

Manual (human or muscular) power is transmitted via the drive mechanism 18 to the rear wheel 14 to move the bicycle 10. The drive mechanism 18 includes a crank 26, two pedals 28, a front rotor 32, a rear rotor 34, and a chain 36.

The crank 26 includes a crankshaft 38 and two crank arms 40. The crankshaft 38 is rotatably supported by a housing 86 of the bicycle drive unit 80 that is coupled to the frame 20. The two crank arms 40 are respectively coupled to the two axial ends of the crankshaft 38. The two pedals 28 each include a pedal body 28A and a pedal shaft 28B. The pedal shaft 28B is coupled to the corresponding crank arm 40. The pedal body 28A is supported by the corresponding pedal shaft 28B in a state in which the pedal body 28A is rotatable relative to the pedal shaft 28B.

The front rotor 32 is coupled by an output portion 30 of the bicycle drive unit 80 to the crankshaft 38. Preferably, the front rotor 32 is coaxial with the crankshaft 38. The rear wheel 14 includes a hub (not shown). The hub of the rear wheel 14 is supported by the rear end of the frame 20. In one example, the front rotor 32 includes a front sprocket, and the rear rotor 34 includes a rear sprocket. The chain 36 is wound around the front rotor 32 and the rear rotor 34. The application of manual (human or muscular) power to the pedals 28 rotates the crank 26 in one direction. This further rotates the rear wheel 14 in the same direction through the front rotor 32, the chain 36, and the rear rotor 34. In the present embodiment, the rear rotor 34 includes a plurality of rear sprockets that have different number of teeth.

Figure 2:
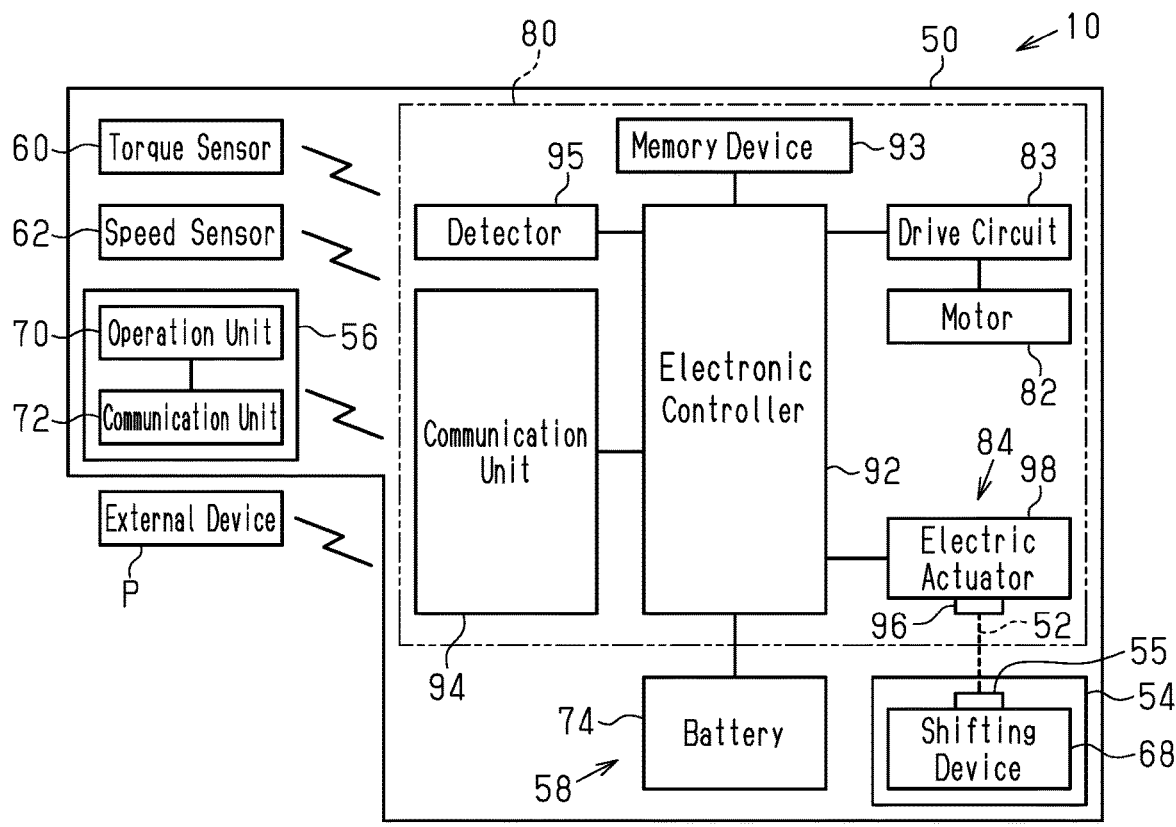
FIG. 2 is a block diagram showing the electric configuration of the bicycle drive system of FIG. 1.

As shown in FIG. 2, the bicycle drive system 50 includes the bicycle drive unit 80, a wire 52, and a bicycle component 54. In one example, the bicycle drive system 50 includes an operation device 56, a battery unit 58, a torque sensor 60, and a speed sensor 62.

Figure 3:
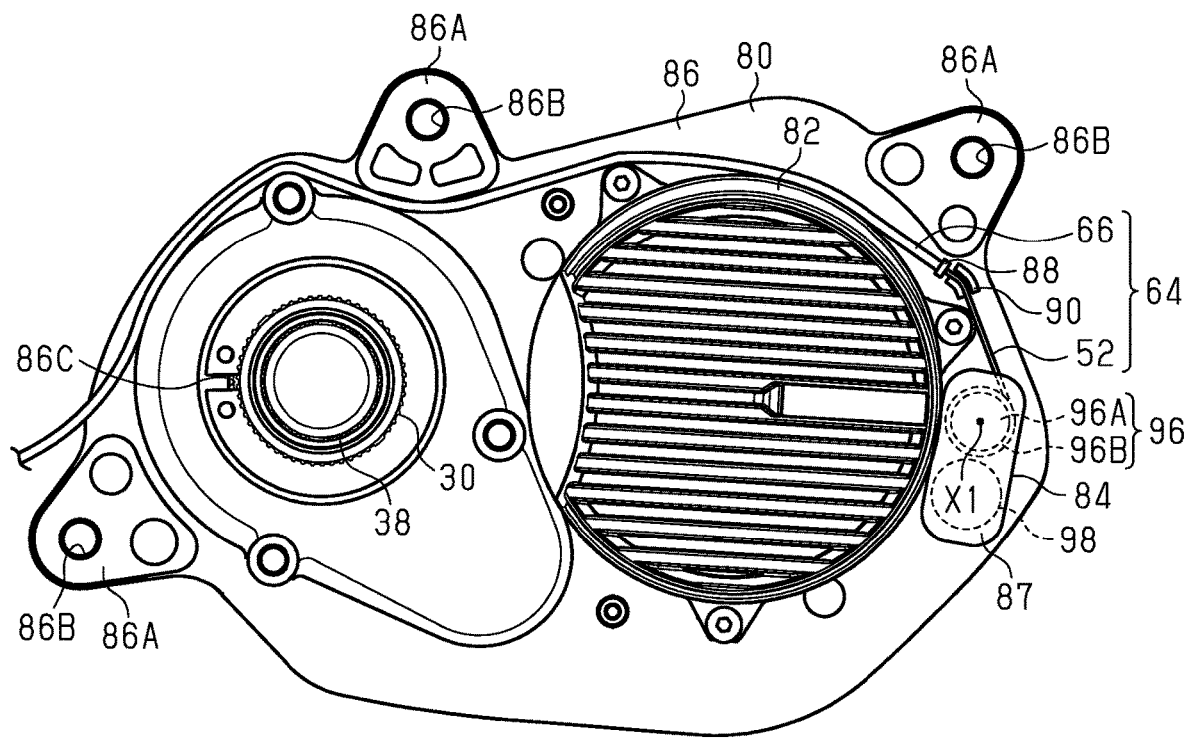
FIG. 3 is a side view of the bicycle drive unit of FIG. 1.

As shown in FIG. 3, the wire 52 is an inner cable of a Bowden cable 64. The Bowden cable 64 includes the wire 52 and an outer cable 66. The wire 52 is formed from, for example, at least one of metal and synthetic resin. In one example, the wire 52 is formed by a number of strands. The wire 52 is provided inside the hollow outer cable 66 and is movable relative to the outer cable 66.

As shown in FIG. 1, the bicycle component 54 includes a shifting device 68. The shifting device 68 is configured to change the ratio of the rotation speed of the rear wheel 14 relative to the rotation speed of the crank 26. The shifting device 68 includes a rear derailleur. The rear derailleur includes a base portion that is configured to be coupled to the frame 20, a movable portion that is movable relative to the base, a coupling portion that couples the base portion and the movable portion, and a chain guide that guides the chain. The chain guide includes a guide pulley and a tension pulley. The chain 36 is wound around the guide pulley and the tension pulley. The shifting device 68, which is located proximate to the rear end of the frame 20, shifts the chain 36 between different rear sprockets of the rear rotor 34. One end of the wire 52 shown in FIG. 2 is coupled to a wire connection portion 96 of a wire operation device 84 of the bicycle drive unit 80. The other end of the wire 52 is coupled to the shifting device 68. The bicycle component 54 includes a wire connection portion 55 connected to the other end of the wire 52.

The operation device 56 is coupled to the handlebar 24. The operation device 56 is operable by a rider. The operation device 56 includes an operation unit 70 and a communication unit 72. In one example, the operation unit 70 is a lever. The communication unit 72 is configured to communicate with a communication unit 94 of the bicycle drive unit 80 (refer to FIG. 2) through wireless connection. If the operation unit 70 is operated, then the operation device 56 outputs a shift-up signal or a shift-down signal in accordance with the operation to the communication unit 72. The communication units 72 and 94 can also each be considered to be a wireless communicator.

As shown in FIG. 1, the battery unit 58 includes a battery 74 and a battery holder 76, which is used to couple the battery 74 to the frame 20 in an attachable and removable manner. The battery 74 includes one or more battery cells. The battery 74 is electrically connected by wires to the bicycle drive system 50. The battery 74 supplies the bicycle drive unit 80 and the bicycle component 54 with power.

The torque sensor 60 shown in FIG. 2 is configured to communicate with the communication unit 94 of the bicycle drive unit 80 through wire connection or wireless connection. The torque sensor 60 outputs a signal that is in accordance with the manual (human or muscular) power. The torque sensor 60 detects the manual (human or muscular) power applied to the crankshaft 38. The torque sensor 60 can be located between the crankshaft 38 and the front rotor 32, on the crankshaft 38 or the front rotor 32, or on the crank arms 40 or the pedals 28. The torque sensor 60 can be realized by, for example, any one of a strain gauge, a magnetostrictive sensor, an optical sensor, and a pressure sensor. Any sensor can be used as the torque sensor 60 as long as the sensor outputs a signal corresponding to the manual (human or muscular) power applied to the crank arms 40 or the pedals 28.

The speed sensor 62 is configured to communicate with the communication unit 94 of the bicycle drive unit 80 through wire connection or wireless connection. The speed sensor 62 is coupled to the frame 20 shown in FIG. 1. The speed sensor 62 detects the magnetic force of a magnet M attached to the rear wheel 14. The speed sensor 62 outputs a signal corresponding to a relative position with the magnet M to an electronic controller 92. Preferably, the speed sensor 62 includes a magnetic reed, which forms a reed switch, or a Hall element. The speed sensor 62 can be coupled to the front fork 22 and be configured to detect a magnet attached to the front wheel 12.

As shown in FIGS. 2 and 3, the bicycle drive unit 80 includes a motor 82 and the wire operation device 84. In one example, the bicycle drive unit 80 further includes the output portion 30, a drive circuit 83, the housing 86, a holder 88, a guide 90, the electronic controller 92, a memory device 93, the communication unit 94, and a detector 95. Preferably, the bicycle drive unit 80 further includes the crankshaft 38.

The housing 86 is configured to accommodate at least a portion of the motor 82. The housing 86 can be configured to accommodate only part of the output shaft of the motor 82 or all of the motor 82. Preferably, the housing 86 accommodates the motor 82, the drive circuit 83, the wire operation device 84, the electronic controller 92, the memory device 93, and the detector 95. Preferably, at least a portion of the communication unit 94 is accommodated in the housing 86.

As shown in FIG. 3, the housing 86 includes frame connection portions 86A that are connectable to the frame 20 of the bicycle 10 (refer to FIG. 1). Preferably, the housing 86 includes multiple frame connection portions 86A. The frame connection portions 86A are located on the peripheral portion of the housing 86. The frame connection portions 86A each include a hole 86B into which a bolt (not shown) is inserted. The housing 86 further includes a hole 86C into which the crankshaft 38 is inserted. The housing 86 supports the crankshaft 38 of the bicycle 10. The housing 86 supports the crankshaft 38 with bearings.

The motor 82 shown in FIG. 2 is configured to assist the propulsion of the bicycle 10. The motor 82 includes an electric motor. The motor 82 transmits the output torque of the motor 82 to the output portion 30. The drive circuit 83, which includes an inverter circuit, controls the current supplied to the motor 82 based on a command from the electronic controller 92. A one-way clutch is located in a power transmission path that extends between the motor 82 and the output portion 30 so that the torque of the crank 26 does not affect the rotation generated by the motor 82 as long as the crankshaft 38 is rotated in a direction that moves forward the bicycle 10. The bicycle drive unit 80 can further include a reduction drive that decelerates the rotation generated by the motor 82 and outputs the decelerated rotation to the output portion 30. The bicycle drive unit 80 can further include a two-way clutch located in a power transmission path that extends between the crankshaft 38 and the output portion 30 to permit transmission of the torque of the crank 26 to the output portion 30 as long as the crankshaft 38 is rotated in a direction that moves forward the bicycle 10 and restrict transmission of the torque of the crank 26 to the output portion 30 if the crankshaft is rotated in a direction opposite to the direction that moves forward the bicycle 10.

The wire operation device 84 shown in FIG. 3 operates the wire 52 that is connectable to the bicycle component 54. The wire operation device 84 further includes the wire connection portion 96 and an electric actuator 98. The wire operation device 84 is provided on the housing 86. At least a portion of the wire operation device 84 is accommodated in the housing 86. In one example, the wire operation device 84 is entirely accommodated in the housing 86.

Figure 4:
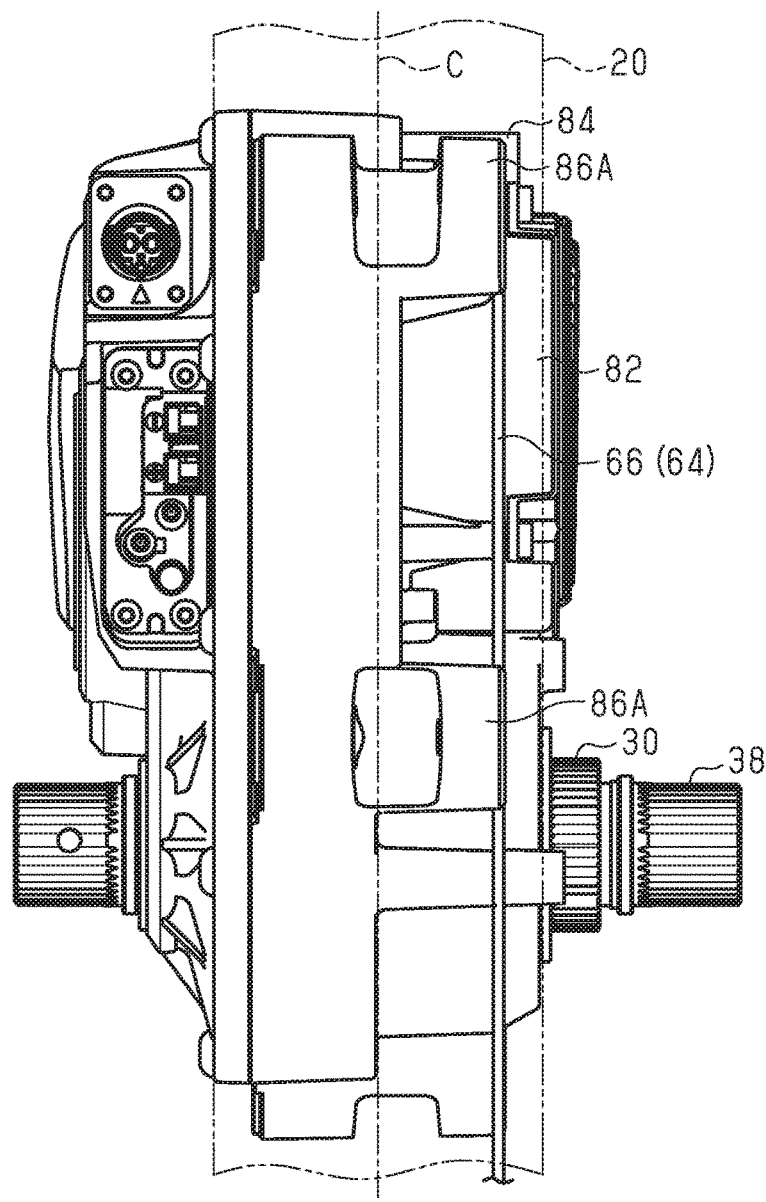
FIG. 4 is a plan view of the bicycle drive unit of FIG. 1.

Referring to FIG. 4, in a state in which the housing 86 is provided on the bicycle 10, the wire connection portion 96 of the wire operation device 84 is located at a position separated from a center C of the frame 20 in a direction in which the crankshaft 38 of the bicycle 10 extends. The center C of the frame 20 of the bicycle 10 corresponds to the center of the crankshaft 38 in the axial direction. In a case in which the wire connection portion 55 of the bicycle component 54 is located at one side of a first plane that lies along the center C of the frame 20 of the bicycle 10 and is orthogonal to the direction in which the crankshaft 38 extends, preferably, the wire connection portion 96 of the wire operation device 84 is also located at the same side of the first plane. For example, in a case in which the wire connection portion 55 of the bicycle component 54 is located at a position separated toward the right from the center C of the frame 20 of the bicycle 10 with respect to the traveling direction of the bicycle 10, the wire operation device 84 is located at a position separated toward the right from the center C of the frame 20 of the bicycle 10 with respect to the traveling direction of the bicycle 10. The wire operation device 84 can be located at a position that lies along the center C of the frame 20 of the bicycle 10.

The wire operation device 84, the holder 88, and the guide 90 can be located in any of a front portion, a rear portion, and a middle portion of the drive unit 80 with respect to the traveling direction of the bicycle 10 in a state in which the drive unit 80 is coupled to the bicycle 10. Further, the wire operation device 84 can be located at any of a top portion and a bottom portion of the drive unit 80 in a state in which the drive unit 80 is coupled to the bicycle 10.

In a state in which the housing 86 is provided on the bicycle 10, preferably, the holder 88 is located at a position separated from the center C of the frame 20 of the bicycle 10 in the direction in which the crankshaft 38 of the bicycle 10 extends.

The wire connection portion 96 is connectable to the wire 52 and configured to rotate and operate the wire 52. The wire connection portion 96 includes a tubular cylinder 96A and a catch (not shown), which is located in an outer circumferential portion 96B of the cylinder 96A about the axis X1 to hook an end of the wire 52. The outer circumferential portion 96B of the cylinder 96A includes a groove that extends in the circumferential direction and receives the end of the wire 52. The cylinder 96A does not have to be a perfect cylinder and can have, for example, a semi-cylindrical cross-section. The wire connection portion 96 is rotatably supported by the housing 86. The electric actuator 98 is coupled to the wire connection portion 96.

The electric actuator 98 differs from the motor 82. The electric actuator 98 is supported by a first portion 87 of the housing 86 that accommodates the wire operation device 84. In one example, the electric actuator 98 includes an electric motor. The electric actuator 98 transmits torque to the wire connection portion 96. The electric actuator 98 can directly transmit torque to the wire connection portion 96. The wire operation device 84 can further include a reduction drive (not shown) to transmit torque via the reduction drive to the wire connection portion 96. In one example, the reduction drive includes at least one of a worm gear and a planetary gear mechanism. The wire operation device 84 can further include a clutch mechanism that transmits the torque of the electric actuator 98 to the wire connection portion 96 and limits or restricts the transmission of torque from the wire connection portion 96 to the electric actuator 98. The electric actuator 98 can rotate the cylinder 96A in two opposite directions about the axis X1. The cylinder 96A is rotated about the axis X1 to operate the wire 52. Power is supplied to the electric actuator 98 to adjust the rotation phase of the cylinder 96A.

Figure 5:
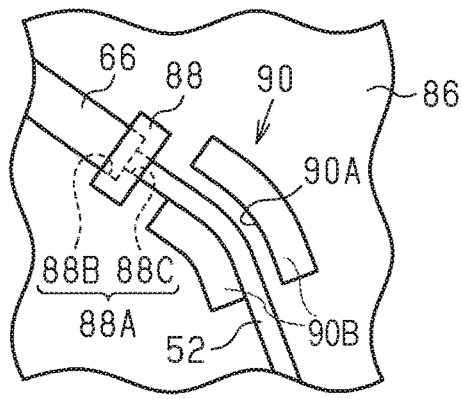
FIG. 5 is a partially, enlarged side view showing the vicinity of a guide of FIG. 3.

As shown in FIG. 5, the holder 88 is provided on the housing 86. The holder 88 is configured to hold an end of the outer cable 66. In one example, the holder 88 includes a through hole 88A. The through hole 88A includes a first hole 88B, into which the outer cable 66 is insertable, and a second hole 88C, which is connected to the first hole 88B and has a diameter that is smaller than that of the outer cable 66 and larger than that of the wire 52. In a state in which the outer cable 66 is held by the holder 88, the wire 52 is inserted through the second hole 88C. The holder 88 can include a slit connected to the first hole 88B to insert the outer cable 66 into the first hole 88B from a direction orthogonal to the direction in which the through hole 88A extends.

The guide 90 is provided on the housing 86 to guide the wire 52. The guide 90 is located along the path of the wire 52 between the wire operation device 84 and the bicycle component 54. In the present embodiment, the guide 90 is located between the wire operation device 84 and the holder 88. The guide 90 is configured to contact the wire 52 and guide the movement of the wire 52. As shown in FIG. 5, the guide 90 includes a groove 90A provided on the housing 86. The groove 90A is defined by a pair of elongated protrusions 90B. Preferably, the wire 52 is fitted into the groove 90A, and the groove 90A is bent to change the extending direction of the wire 52. Preferably, the bent portion of the groove 90A is formed by a curved surface of the elongated protrusions 90B. Preferably, the guide 90 is located at a position where the extending direction of the wire 52 changes.

The electronic controller 92 shown in FIG. 2 includes at least one processor that executes predetermined control programs. The processor includes a Central Processing Unit (CPU) or a Micro-Processing Unit (MPU). The electronic controller 92 can include one or more microcomputers. The electronic controller 92 typically includes a general circuit such as an input interface circuit or an output interface circuit. The electronic controller 92 controls the wire operation device 84. The electronic controller 92 controls the wire operation device 84 in accordance with the information input to the communication unit 94. The electronic controller 92 controls the motor 82. The electronic controller 92 controls the motor 82 in accordance with the outputs of the torque sensor 60 and the speed sensor 62.

The memory device 93 includes, for example, a non-volatile memory and a volatile memory and can includes a ROM (Read Only Memory) device, a RAM (Random Access Memory) device, a hard disk, a flash drive, etc. The memory device 93 is any computer storage device or any computer readable medium with the sole exception of a transitory, propagating signal. The memory device 93 stores various programs and information used in various control processes. The memory device 93 stores information related to the movement amount of the wire 52 that is required to have the bicycle component 54 perform a predetermined action. The electronic controller 92 is configured to change the information related to the movement amount of the wire 52 stored in the memory device 93 in accordance with the operation of an external device P. In the present embodiment, the movement amount of the wire 52 is set in accordance with the interval between adjacent rear sprockets. The external device P includes, for example, a personal computer, a tablet PC, and a smartphone. The external device P can communicate with the electronic controller 92 via the communication unit 94 through wire connection or wireless connection to change the contents of the memory device 93.

The communication unit 94 is configured to communicate with the operation device 56. The communication unit 94 communicates with the operation device 56 through wireless connection. The communication unit 94 receives a shift-up signal and a shift-down signal that are output by the communication unit 72 of the operation device 56.

The detector 95 detects movement of the wire 52. The detector 95 includes, for example, a rotary encoder. In this case, the detector 95 outputs a signal corresponding to the rotation angle of the wire connection portion 96, the electric actuator 98, or a gear of a reduction drive to the electronic controller 92. The electronic controller 92 recognizes the movement amount of the wire 52 from the output of the detector 95. The electronic controller 92 determines from the output of the detector 95 whether or not movement of the wire 52 is normal. More specifically, the electronic controller 92 calculates, from the output of the detector 95, at least one of the movement amount of the wire 52, the movement time of the wire 52, and the load applied to the wire 52. The electronic controller 92 further compares the calculation result with information stored beforehand in the memory device 93 to determine whether or not movement of the wire 52 is normal. The electronic controller 92 controls the electric actuator 98 in accordance with the information related to the movement amount of the wire 52 that is stored in the memory device 93. If the actual movement amount of the wire 52 detected by the detector 95 does not coincide with the movement amount of the wire 52 based on the information stored in the memory device 93, then the electronic controller 92 changes the information related to the movement amount of the wire 52 stored in the memory device 93 so that the actual movement amount of the wire 52 matches the movement amount of the wire 52 based on the information stored in the memory device 93.

The wire operation device 84 actuates the electric actuator 98 to operate the wire 52. More specifically, actuation of the electric actuator 98 rotates the wire connection portion 96. In accordance with the rotation direction of the wire connection portion 96, the wire 52 is wound onto the wire connection portion 96 or unwound from the wire connection portion 96. The movable portion of the shifting device 68 is moved relative to the frame 20 in accordance with the movement direction and the movement amount of the wire 52. This shifts the chain 36 from one rear sprocket onto a rear sprocket having a larger diameter or a rear sprocket having a smaller diameter.

The electronic controller 92 controls the wire operation device 84 to move the wire 52 over a first movement amount in one of a first direction or a second direction, which is opposite to the first direction. Then, the electronic controller 92 controls the wire operation device 84 to move the wire 52 over a second movement amount, which is less than the first movement amount, in the other one of the first direction and the second direction. The chain guide of the derailleur is operated by the wire operation device 84 at a position corresponding to each sprocket. The optimal chain guide position while each sprocket is being driven (hereinafter referred to as "the first position") can differ from the optimal chain guide position for shifting (hereinafter referred to as "the second position"). The first movement amount is greater than the amount the wire 52 is moved by moving the chain guide from the first position corresponding to one of two adjacent sprockets to the first position corresponding to the other one of the adjacent sprockets. The first movement amount is less than the amount the wire 52 is moved by moving the chain guide from the first position corresponding to the one of three adjacent sprockets having the smallest number of teeth to the first position corresponding to the one of the three adjacent sprockets having the largest number of teeth. In particular, in a case in which the chain 36 is shifted from a sprocket having a small number of teeth to a sprocket having a large number of teeth, the second position corresponding to the sprocket having the large number of teeth can be farther than the first position corresponding to the sprocket having the large number of teeth from the sprocket having the small number of teeth. Thus, preferably, in a case in which the chain 36 is shifted from a sprocket having a small number of teeth to a sprocket having a large number of teeth, the chain guide passes by the first position corresponding to the sprocket having the large number of teeth and moves to the second position corresponding to the sprocket having the large number of teeth. Preferably, the first movement amount is set to the movement amount of the wire 52 in a case in which the chain guide is moved from the first position corresponding to one of two adjacent sprockets to the second position corresponding to the other one of two adjacent sprockets. Preferably, the second movement amount is set to the amount the wire 52 is moved by moving the chain guide from the second position corresponding to one sprocket to the first position corresponding to that sprocket.

The first direction and the second direction for a shift-up can be reverse to the first direction and the second direction for a shift-down. If the electronic controller 92 receives a shift-up signal or a shift-down signal, then the electronic controller 92 can move the wire 52 over the first movement amount in one of the first direction and the second direction to move the chain 36 from a sprocket having a small number of teeth to a sprocket having a large number of teeth and then move the wire 52 over the second movement amount in the other one of the first direction and the second direction. In this case, to shift the chain 36 from a sprocket having a large number of teeth to a sprocket having a small number of teeth, the electronic controller 92 moves the wire 52 over the first movement amount in the other one of the first direction and the second direction.

Second Embodiment

The bicycle drive system 50 in a second embodiment will now be described with reference to FIGS. 6 and 7. The bicycle drive system 50 in the second embodiment is similar to the bicycle drive system 50 in the first embodiment except in that a bicycle drive unit 100 is separate from a wire operation device 110. Same reference numerals are given to those components that are the same as the corresponding components of the first embodiment. Such components will not be described in detail.

Figure 6:
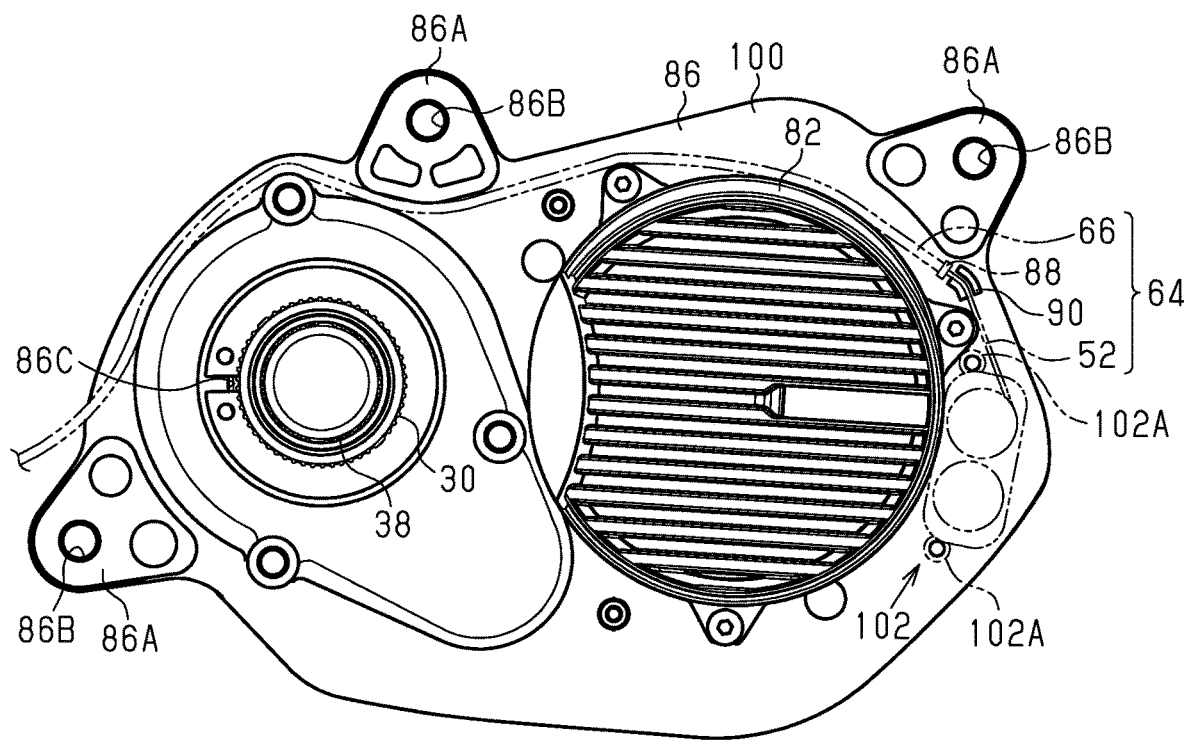
FIG. 6 is a side view of a bicycle drive unit in a second embodiment.

As shown in FIG. 6, the bicycle drive unit 100 includes the motor 82 and an attachment portion 102, to which the wire operation device 110 is attachable. The attachment portion 102 is provided on the housing 86. The attachment portion 102 is provided in the peripheral portion of the housing 86. Preferably, the attachment portion 102 is located at a position separated from the center C of the frame 20 of the bicycle 10 in the direction in which the crankshaft 38 of the bicycle 10 extends. In a case in which the wire connection portion 55 of the bicycle component 54 is located at one side of the first plane that lies along the center C of the frame 20 of the bicycle 10 and is orthogonal to the direction in which the crankshaft 38 extends, preferably, the attachment portion 102 of the wire operation device 84 is also located at the same side of the first plane. For example, in a case in which the wire connection portion 55 of the bicycle component 54 is located at a position separated toward the right from the center C of the frame 20 of the bicycle 10 with respect to the traveling direction of the bicycle 10, the attachment portion 102 is located at a position separated toward the right from the center C of the frame 20 of the bicycle 10 with respect to the traveling direction of the bicycle 10. In one example, the attachment portion 102 includes holes 102A, into which bolts B are insertable. Preferably, the wall of each hole 102A is threaded. Preferably, there are multiple holes 102A that are spaced apart from each other.

Figure 7:
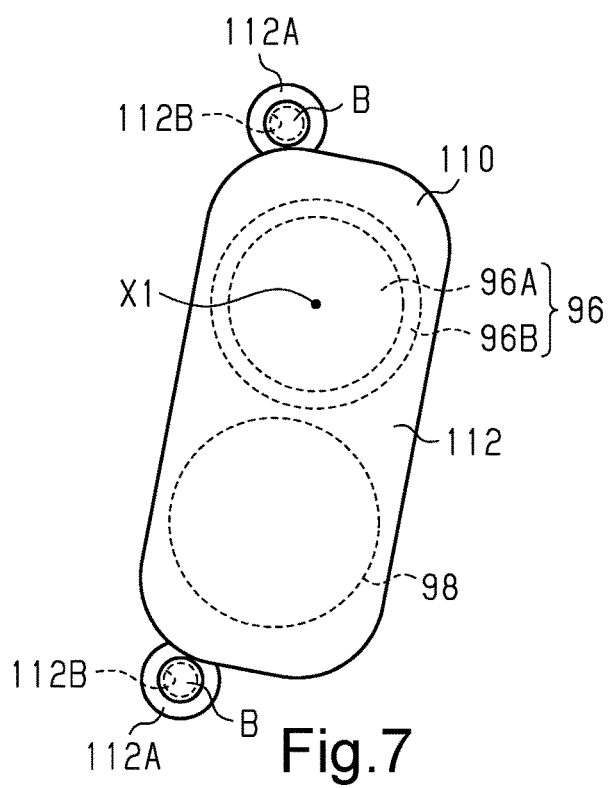
FIG. 7 is a side view of a wire operation device in the second embodiment.

As shown in FIG. 7, the wire operation device 110 includes the wire connection portion 96, the electric actuator 98, and a support 112. The wire operation device 110 can further include a reduction drive and the detector 95. The wire operation device 110 is attachable to and removable from the housing 86. The wire operation device 110 further includes a second connector that is attachable to and removable from a first connector connected to the electronic controller 92. The second connector is electrically connected to an electric actuator by a wire. The first connector is electrically connected to the electronic controller 92 by a wire. The first connector can be located inside the housing 86 and exposed to the outside of the housing 86. The support 112 supports the wire connection portion 96 and the electric actuator 98. In a case in which the wire operation device 110 includes a reduction drive and the detector 95, the support 112 supports the reduction drive and the detector 95. In a state in which the support 112 is coupled to the drive unit 100, a housing covers the wire connection portion 96 and the electric actuator 98 so that the wire connection portion 96 and the electric actuator 98 are not exposed to the outside. Preferably, a housing of the support 112 covers the wire connection portion 96 and the electric actuator 98 so that the wire connection portion 96 and the electric actuator 98 are not exposed to the outside even when the housing is removed from the drive unit 100. The housing of the support 112 includes a hole (not shown) through which the wire 52 is inserted. The support 112 includes an attachment portion 112A. The attachment portion 112A is configured to be attached to the attachment portion 102 of the bicycle drive unit 100 by bolts B. The attachment portion 112A includes holes 112B through which the bolts B are inserted. Preferably, there are multiple holes 112B spaced apart from each other in the peripheral portion of the support 112. In a state in which the wire operation device 110 is attached to the attachment portion 102, the wire operation device 110 can be fixed to the attachment portion 102. One example for fixing the wire operation device 110 to the attachment portion 102 is welding or bonding that uses an adhesive agent.

Modifications

A bicycle drive system and a bicycle drive unit according to the present invention are exemplified in each of the above embodiments. However, the present invention is not limited to the above embodiments. Particularly, it should be understood that the present invention can be embodied in the modifications described below.

Figure 8:
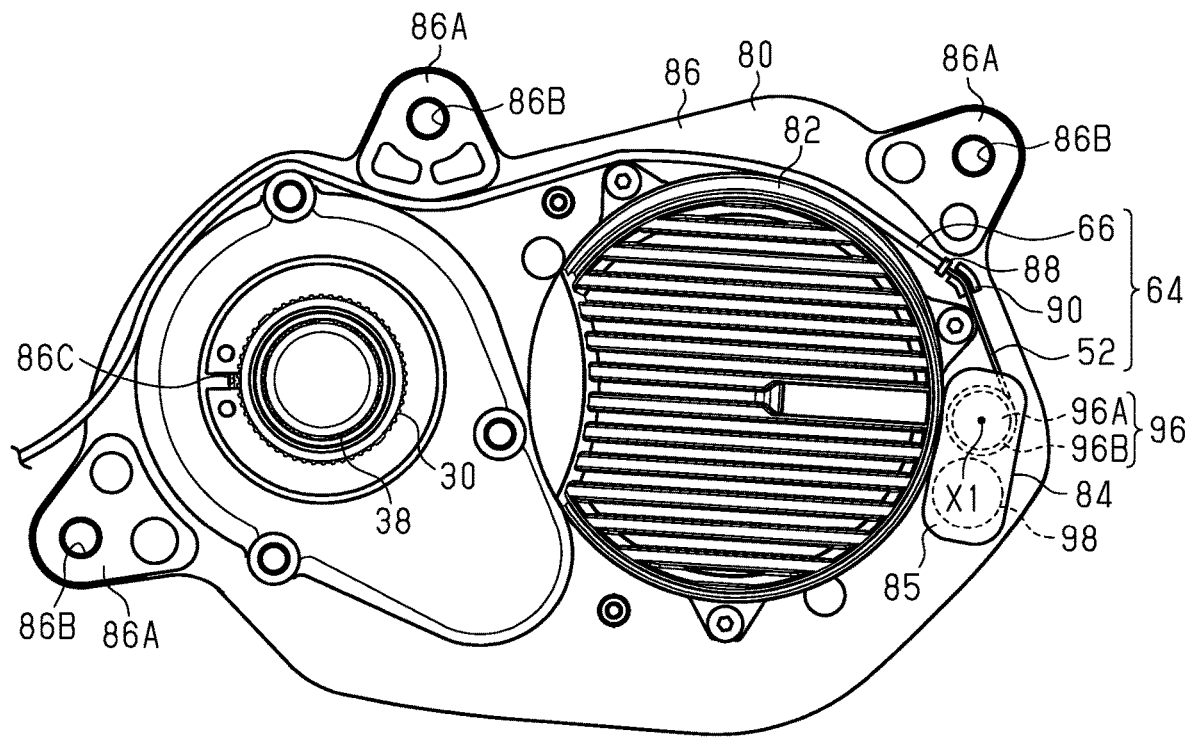
FIG. 8 is a side view showing a bicycle drive unit in a first modification.

As shown in FIG. 8, the wire operation device 84 of the first embodiment can be located outside the housing 86. These modifications can further include a cover 85 that covers the wire operation device 110. Multiple wire operation devices 84 can be located in the bicycle drive unit 80 of the first embodiment.

The bicycle drive unit 80 of the first embodiment can further include the attachment portion 102 of the second embodiment to attach the wire operation device 110. In this case, the wire operation devices 84 and 110 can operate different types of bicycle components.

Figure 9:
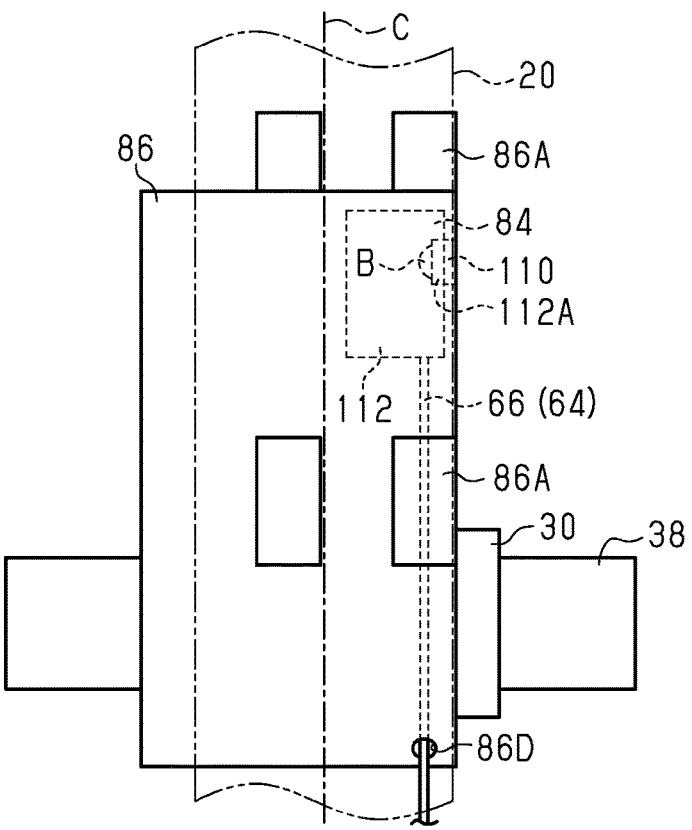
FIG. 9 is a side view showing a bicycle drive unit in a second modification.

The bicycle drive unit 100 of the second embodiment can be modified as shown in FIG. 9. The attachment portion 102 of the bicycle drive unit 100 shown in FIG. 9 is located inside the housing 86. The wire operation device 110 is accommodated in the housing 86. The housing 86 includes a hole 86D. The wire 52 extends out of the housing 86 through the hole 86D. The guide 90 can be located inside the housing 86.

Figure 10:
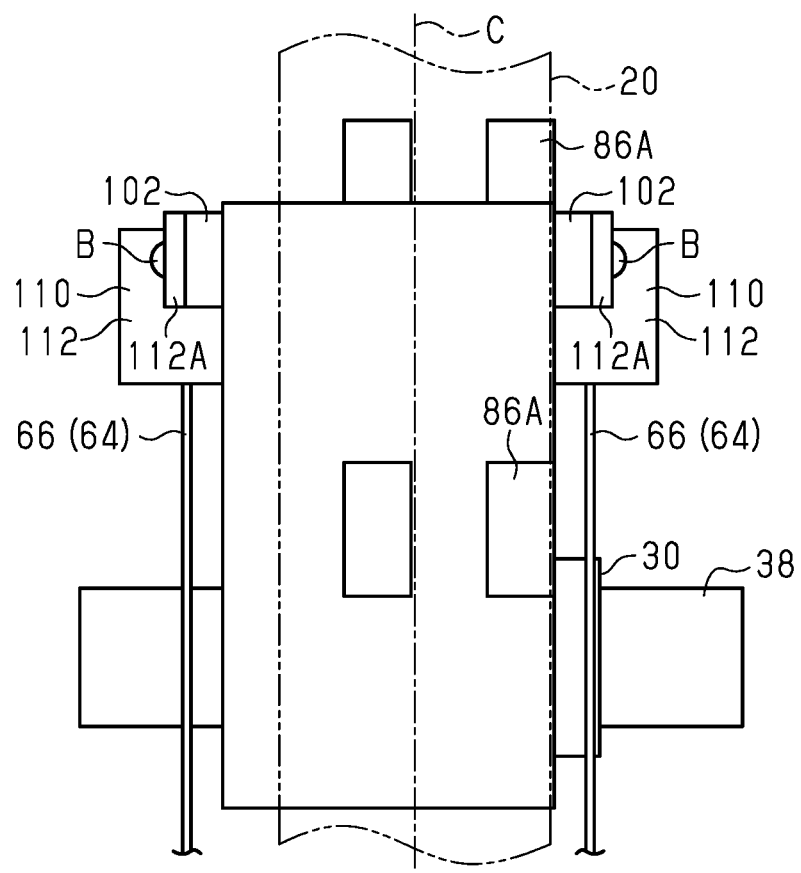
FIG. 10 is a side view showing a bicycle drive unit in a third modification.

The bicycle drive unit 100 of the second embodiment can be modified as shown in FIG. 10. The bicycle drive unit 100 of FIG. 10 includes a plurality of the attachment portions 102. The attachment portions 102 can be located on different planes of the housing 86 of the bicycle drive unit 100 or on the same plane of the housing 86. Further, at least one attachment portion 102 can be located inside the housing 86, and at least one attachment portion 102 can be located on the peripheral portion of the housing 86. The wire operation devices 110 provided on the corresponding attachment portions 102 operate the wires 52 connected to different bicycle components.

In each embodiment, the guide 90 can be separate from the housing 86. For example, the guide 90 that includes the groove 90A can be bolted to the housing 86. If the guide 90 is separate from the housing 86, then the guide 90 can be attachable to and removable from the housing 86.

The bicycle drive units 80 and 100 can each include multiple guides 90. In this case, in a state in which the bicycle drive units 80 and 100 are coupled to the frame with the housing 86 provided on the bicycle 10, preferably, the guide 90 located at a position that is closest to the bicycle component 54 is located at a position separated from the center C of the frame 20 of the bicycle 10 in the direction in which the crankshaft 38 of the bicycle 10 extends.

The bicycle drive units 80 and 100 can include multiple holders 88. In this case, in a state in which the housing 86 is provided on the bicycle 10, preferably, the holders 88 are each located at a position separated from the center C of the frame 20 of the bicycle 10 in the direction in which the crankshaft 38 of the bicycle 10 extends. Preferably, the holders 88 are provided on the housing 86 so that the corresponding first holes 88B extend in different directions.

At least one of the holder 88 and the guide 90 can be omitted from the bicycle drive units 80 and 100. If the holder 88 is omitted and the guide 90 is employed, in a state in which the housing 86 is provided on the bicycle 10, then preferably the guide 90 is located at a position separated from the center C of the frame 20 of the bicycle 10 in the direction in which the crankshaft 38 of the bicycle 10 extends.

Figure 11:
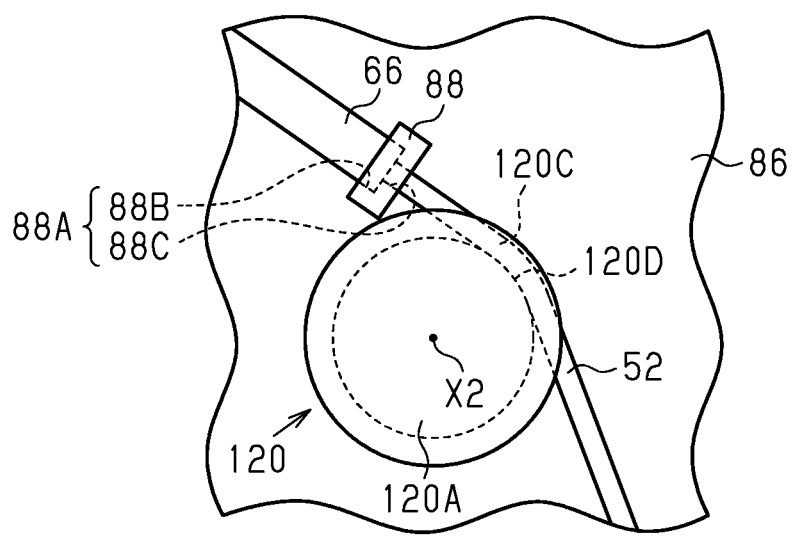
FIG. 11 is a side view showing a bicycle drive unit in a fourth modification.

The guide 90 of each of the bicycle drive units 80 and 100 can be modified to a guide 120 that is shown in FIG. 11. The guide 120 includes a roller 120A that is rotatable relative to the housing 86. The roller 120A can be attachable to and removable from the housing 86 or non-separable from the housing 86. The roller 120A rotates around the center axis X2. The roller 120A has a circumferential portion 120C that includes a groove 120D extending in the circumferential direction. The wire 52 is insertable into the groove 120D. The wire 52 is wound onto the roller 120A so that the extending direction of the wire 52 can be changed. The guide 90 can include both of the groove 90A and the roller 120A.

The communication unit 94 of each of the bicycle drive units 80 and 100 can be wire-connected to the communication unit 72 of the operation device 56. The communication unit 94 of each of the bicycle drive units 80 and 100 and the communication unit 72 of the operation device 56 can be connected by, for example, a power line communication wire to perform Power Line Communication (PLC). In this case, the communication unit 94 and the communication unit 72 function as PLC ports, and can also each be considered to be a wired communicator.

The communication unit 94 of each of the bicycle drive units 80 and 100 can communicate with a sensor that detects the condition of the bicycle 10. In one example, the sensor that detects the condition of the bicycle 10 is the torque sensor 60 or the speed sensor 62. In this case, the electronic controller 92 can control the wire operation device 84 in accordance with the output of the sensor that detects the condition of the bicycle 10.

The wire operation devices 84 and 110 can each include an electronic controller and a memory device that are separate from the electronic controller 92 and the memory device 93 of the drive unit 80. In this case, preferably, the information related with the actions of the wire operation device 84 and 110 is stored in memories of the wire operation devices 84 and 110. Preferably, the electronic controllers of the wire operation devices 84 and 110 control the actions of the wire operation devices 84 and 110. In this case, the electronic controllers of the wire operation devices 84 and 110 can be configured to communicate with the electronic controller 92 of the drive unit 80.

In the bicycle drive units 80 and 100, the electronic controller 92 can control the wire operation device 84 to move the wire 52 over a third movement amount in one of the first direction or the second direction, which is opposite to the first direction, and then move the wire 52 over a fourth movement amount in the one of the first direction and the second direction. The third movement amount is less than the amount the wire 52 is moved by moving the chain guide from the first position corresponding to one of two adjacent sprockets to the first position corresponding to the other one of the adjacent sprockets. The fourth movement amount is less than the third movement amount. In particular, in a case in which the chain 36 is shifted from a sprocket having a large number of teeth to a sprocket having a small number of teeth, the second position corresponding to the sprocket having the small number of teeth can be closer than the first position corresponding to the sprocket having the small number of teeth to the sprocket having a large number of teeth. Thus, preferably, in a case in which the chain 36 is shifted from a sprocket having a large number of teeth to a sprocket having a small number of teeth, the chain guide moves to the second position corresponding to the sprocket having the small number of teeth before reaching the first position corresponding to the sprocket having the small number of teeth. Preferably, the third movement amount is set to the movement amount of the wire 52 in a case in which the chain guide is moved from the first position corresponding to one of two adjacent sprockets to the second position corresponding to the other one of two adjacent sprockets. Preferably, the fourth movement amount is set to the amount the wire 52 is moved by moving the chain guide from the second position corresponding to one sprocket to the first position corresponding to that sprocket. The electronic controller 92 can switch between the control of the wire operation device 84 of this modified example and the control of the wire operation device 84 of the first embodiment. The electronic controller 92 can also switch between the control of the wire operation device 84 of this modified example and the control of the wire operation device 84 of the first embodiment in accordance with the changes in the transmission ratio.

In each embodiment, if the electronic controller 92 receives a shift-up signal or a shift-down signal, then the electronic controller 92 can be configured to move the wire over the first movement amount in the first direction or the second direction whenever receiving the shift-up signal or the shift-down signal. In this case, preferably, the electronic controller 92 does not move the wire 52 in both of the first direction and the second direction, and the electronic controller 92 does not interrupt the movement of the wire 52.

The wire operation devices 84 and 110 can each include the wire connection portion 96 that is connectable to the wire 52 and moved in a predetermined direction to operate the wire 52. In this case, the wire operation devices 84 and 110 can each include a ball screw mechanism or a rack and pinion mechanism and move the wire connection portion 96 in the predetermined direction in accordance with the action of the electric actuator 98. Further, the wire operation devices 84 and 110 to the electric actuator 98 can be configured to include a direct drive actuator.

Figure 12:
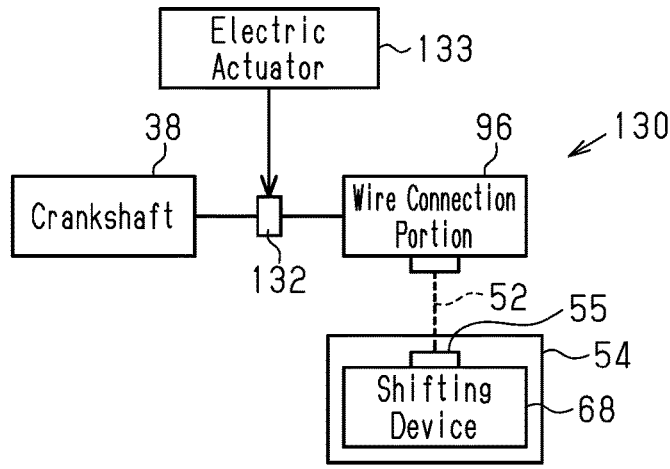
FIG. 12 is a schematic diagram showing power transmission path of a bicycle drive system in a fifth modification.

The wire operation devices 84 and 110 can be replaced by a wire operation device 130 shown in FIG. 12. The wire operation device 130 of FIG. 12 uses the manual (human or muscular) power input to the crank 26 of the bicycle 10 to operate the wire 52. The wire operation device 130 includes the wire connection portion 96 and a clutch 132. The clutch 132 is located between the crank 26 and the wire connection portion 96. The clutch 132 can be switched between a first state that transmits the manual (human or muscular) power input to the crank 26 to the wire connection portion 96 and a second state that cuts the transmission of the manual (human or muscular) power to the wire connection portion 96. The wire operation device 130 controls the clutch 132 to operate the wire 52. The clutch 132 is controlled by an electric actuator 133. The electronic controller 92 controls the electric actuator 133 in accordance with the operation of the operation unit 70 to switch the connection state of the clutch 132. The clutch 132 transmits rotation force to the wire connection portion 96 if the crankshaft 38 rotates in the forward direction and does not transmit rotation force to the wire connection portion 96 if the crankshaft 38 rotates in the reverse direction. The wire connection portion 96 includes a positioning mechanism. The positioning mechanism holds the cylinder 96A of the wire connection portion 96 at a plurality of rotation positions. The positioning mechanism includes, for example, a pawl, a ratchet, and a spring. In a state in which rotation of the crankshaft 38 is not transmitted to the wire connection portion 96, the electric actuator 133 can control the pawl of the positioning mechanism to rotate the wire connection portion 96 with the spring and operate the wire. The wire operation device 130 can operate the wire 52 using the output torque of the motor 82. In a case in which the wire operation device 130 is operated using force generated at the downstream side of the output portion 30, the wire operation device 130 operates the wire 52 with the resultant force of the manual (human or muscular) power input to the crank 26 and the output torque of the motor 82.

In each embodiment, the shifting device 68 of the bicycle component 54 can include a front derailleur instead of a rear derailleur or include a rear derailleur and a front derailleur. If the shifting device 68 includes a front derailleur, then the front rotor 32 includes a plurality of front sprockets. If the shifting device 68 does not include a rear derailleur, then the rear rotor 34 includes a single rear sprocket. If the shifting device 68 includes a rear derailleur and a front derailleur, then the bicycle drive unit 80 can include one wire operation device 84 to operate only one of the rear derailleur and the front derailleur, and the bicycle drive unit 100 can include one wire operation device 110 to operate only one of the rear derailleur and the front derailleur. Alternatively, if the shifting device 68 includes a rear derailleur and a front derailleur, then the bicycle drive unit 80 can include two wire operation devices 84 to operate both of the rear derailleur and the front derailleur, and the bicycle drive unit 100 can include two wire operation devices 110 to operate both of the rear derailleur and the front derailleur.

In each embodiment, instead of a rear derailleur, the shifting device 68 of the bicycle component 54 can include an internal geared hub and a connection portion connected to the internal geared hub. In one example, the internal geared hub is arranged in the axle of the rear wheel 14. An end of the wire 52 is connected to the connection portion. Rotation of the connection portion switches power transmission paths included in the internal geared hub and changes the ratio of the rotation speed of the rear wheel 14 relative to the rotation speed of the crankshaft 38. In a case in which the bicycle component 54 includes the internal geared hub, the front rotor 32 can include a front pulley, and the rear rotor 34 can be configured to include a rear pulley connected by a belt to the front rotor 32. Further, in a case in which the bicycle component 54 includes the internal geared hub, the front rotor 32 can include a front bevel gear, and the rear rotor 34 can be configured to include a rear bevel gear connected by a driveshaft to the front rotor 32.

In each embodiment, the shifting device 68 of the bicycle component 54 can be configured to include at least two of a rear derailleur, a front derailleur, and an internal geared hub. In a case in which a rear derailleur and an internal geared hub are included, the internal geared hub can be provided in the axle of the rear wheel 14 or in the drive unit 80. In a case in which the electronic controller 92 controls the internal geared hub, if the electronic controller 92 receives a shift-up signal or a shift-down signal, then the electronic controller 92 can be configured to move the wire over the first movement amount in the first direction or the second direction whenever receiving the shift-up signal or the shift-down signal. In this case, preferably, the electronic controller 92 does not move the wire 52 in both of the first direction and the second direction, and the electronic controller 92 does not interrupt the movement of the wire 52.

Figure 13:
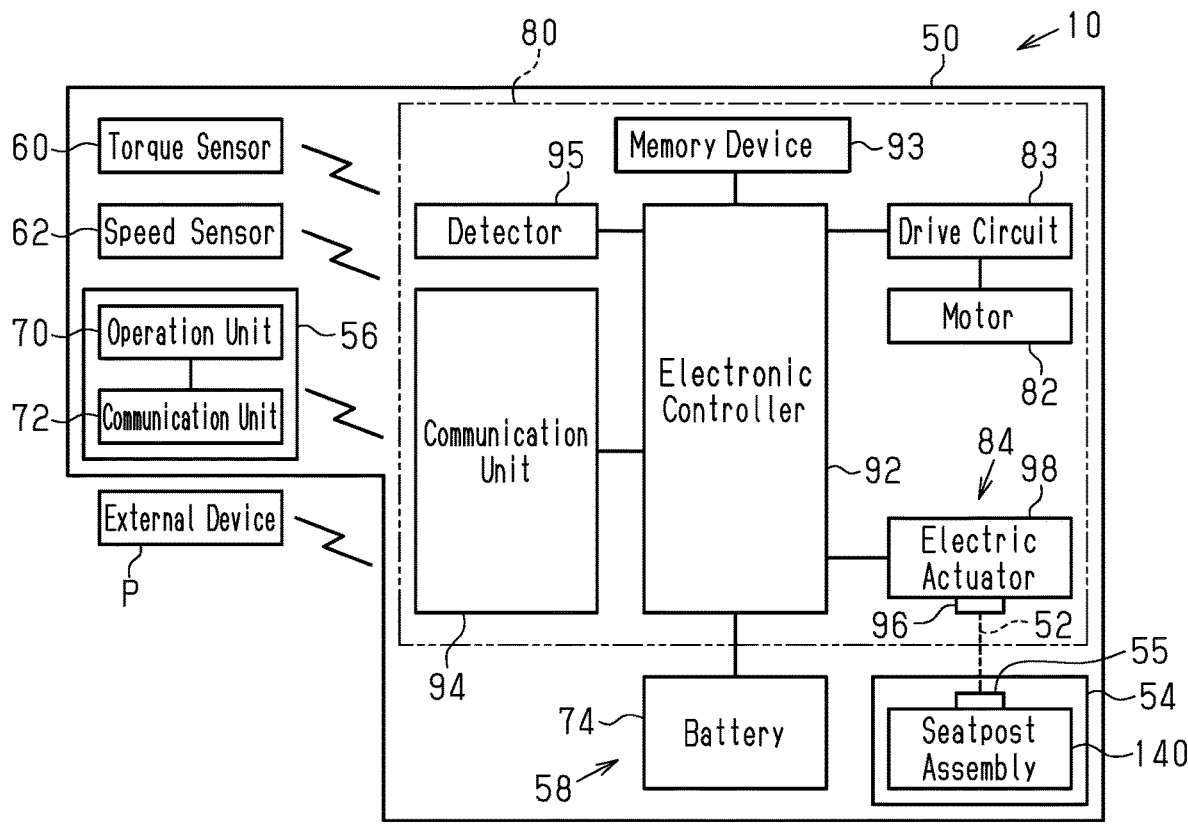
FIG. 13 is a block diagram showing the electric configuration of a bicycle drive system in a sixth modification.

In each embodiment, as shown in FIG. 13, the bicycle component 54 can include a seatpost assembly 140 instead of the shifting device 68. An end of the wire 52 is connected to the seatpost assembly 140. The wire operation devices 84 and 110 operate the wire 52 so that the seatpost height can be changed by the seatpost assembly 140. If the operation unit 70 is operated, then the operation device 56 outputs a first signal from the communication unit 72 to change the seatpost position. Upon cancellation of the operation of the operation unit 70, the operation device 56 stops the output of the first signal or outputs a second signal from the communication unit 72 to stop changing the seatpost position. Upon receipt of the first signal, the electronic controller 92 controls the wire operation devices 84 and 110 to move the wire over the first movement amount in one of the first direction and the second direction. In this case, preferably, the electronic controller 92 does not move the wire 52 in both of the first direction and the second direction, and the electronic controller 92 does not interrupt the movement of the wire 52. If the electronic controller 92 stops receiving the first signal or receives the second signal, upon receipt of the second signal, then the electronic controller 92 controls the wire operation devices 84 and 110 to move the wire over the first movement amount in the other one of the first direction and the second direction. In this case, preferably, the electronic controller 92 does not move the wire 52 in both of the first direction and the second direction, and the electronic controller 92 does not interrupt the movement of the wire 52.

Figure 14:
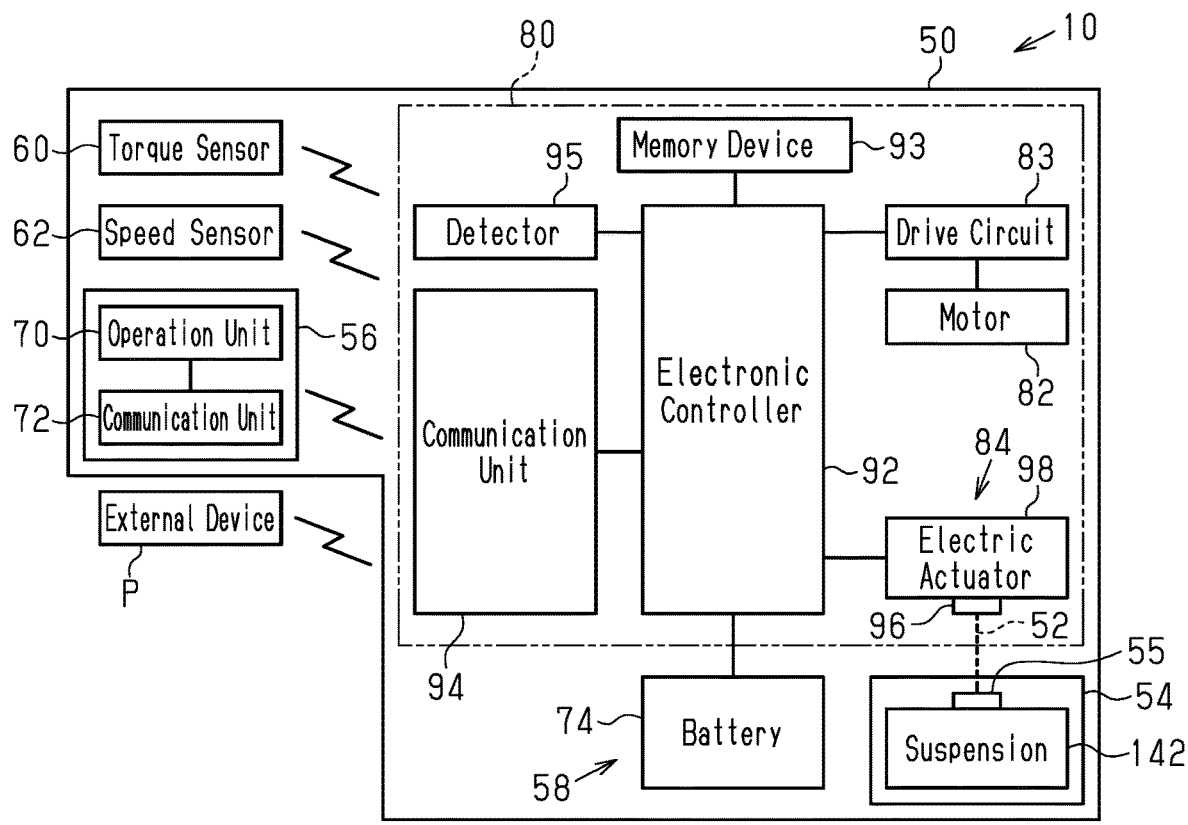
FIG. 14 is a block diagram showing the electric configuration of a bicycle drive system in a seventh modification.

In each embodiment, as shown in FIG. 14, the bicycle component 54 can include a suspension 142 instead of the shifting device 68. An end of the wire 52 is connected to a connection portion of the suspension 142. The suspension 142 includes at least one of a front suspension, which is provided on the front fork 22 to attenuate impact applied to the front wheel 12, and a rear suspension, which is provided on the frame 20 to attenuate impact applied to the rear wheel 14. The suspension 142 is configured to be switched between a first state in which the function of the suspension 142 is restricted and a second state in which the restriction to the function of the suspension 142 is cancelled. In accordance with the operation of the operation unit 70, the operation device 56 outputs, from the communication unit 72, a first signal that sets the suspension 142 in the first state or a second signal that sets the suspension 142 in the second state. Upon receipt of the first signal, the electronic controller 92 controls the wire operation devices 84 and 110 to move the wire over the first movement amount in one of the first direction and the second direction. In this case, preferably, the electronic controller 92 does not move the wire 52 in both of the first direction and the second direction, and the electronic controller 92 does not interrupt the movement of the wire 52. If the electronic controller 92 stops receiving the first signal or receives the second signal, upon receipt of the second signal, then the electronic controller 92 controls the wire operation devices 84 and 110 to move the wire over the first movement amount in the other one of the first direction and the second direction. In this case, preferably, the electronic controller 92 does not move the wire 52 in both of the first direction and the second direction, and the electronic controller 92 does not interrupt the movement of the wire 52.

Figure 15:
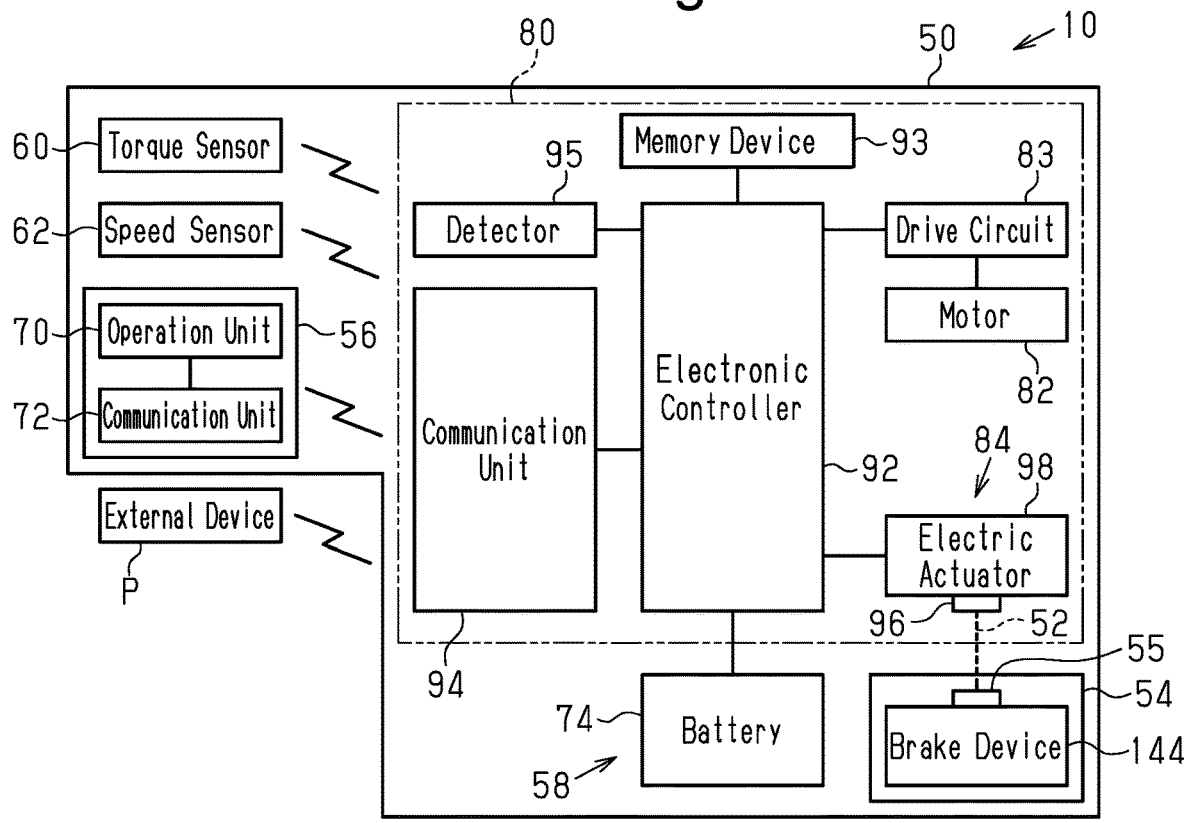
FIG. 15 is a block diagram showing the electric configuration of a bicycle drive system in an eighth modification.

In each embodiment, as shown in FIG. 15, the bicycle component 54 can include a brake device 144 instead of the shifting device 68. An end of the wire 52 is connected to the brake device 144. The brake device 144 includes at least one of a front brake device, which applies the brake to the front wheel 12, and a rear brake device, which applies the brake to the rear wheel 14. The front brake device and the rear brake device are each configured by at least one of a disc brake caliper, a caliper brake device, a cantilever brake device, and a roller brake device. The wire operation devices 84 and 110 operate the wire 52 to switch the brake device 144 between a state in which the brake is applied to the front wheel 12 or the rear wheel 14 and a state in which the brake is not applied to the front wheel 12 or the rear wheel 14. The wire 52 of each of the wire operation devices 84 and 110 is one of two wires 52. Each wire 52 can be connected to the front brake device and the rear brake device to simultaneously actuate the two brake devices. If the operation unit 70 is operated, then the operation device 56 outputs a first signal from the communication unit 72 to pull the wire 52 with the wire operation devices 84 and 110. If the operation of the operation unit 70 is cancelled, then the operation device 56 outputs a second signal from the communication unit 72 to return the pulled wire 52 to its original position. Upon receipt of the first signal, the electronic controller 92 controls the wire operation devices 84 and 110 and moves the wire 52 over the first movement amount in one of the first direction and the second direction. In this case, preferably, the electronic controller 92 does not move the wire 52 in both of the first direction and the second direction, and the electronic controller 92 does not interrupt the movement of the wire 52. If the electronic controller 92 stops receiving the first signal or receives the second signal, upon receipt of the second signal, then the electronic controller 92 controls the wire operation devices 84 and 110 to move the wire over the first movement amount in the other one of the first direction and the second direction. In this case, preferably, the electronic controller 92 does not move the wire 52 in both of the first direction and the second direction, and the electronic controller 92 does not interrupt the movement of the wire 52.

The operation devices 84 and 110 can each further include an operation amount detector that detects the operation amount of the operation unit 70. The electronic controller 92 of the drive unit 80 can receive information detected by the operation amount detector and move the wire 52 in accordance with the operation amount of the operation unit 70.

The bicycle drive units 80 and 100 can be modified so that instead of transmitting the torque of the motor 82 to the output portion 30, the output torque of the motor 82 is transmitted to the chain 36 at the downstream side with respect to the front rotation direction of the front sprocket. In this case, the motor 82 further includes a pulley that transmits torque, and the output torque of the motor 82 is transmitted to the chain 36 by the pulley.

The wire operation device 84 can be omitted from the bicycle drive unit 80 of the first embodiment. Further, the attachment portion 102 can be omitted from the bicycle drive unit 100 of the second embodiment. In this case, the bicycle drive units 80 and 100 each include the motor 82 and the guide 90. The wire operation devices 84 and 110 are each configured to be coupled to a further component of the bicycle 10 or the frame 20 by a bolt, a band, or the like. In one example, the further component of the bicycle 10 is the operation device 56. In this case, the wire 52 is guided by the guide 90 from the operation device 56 to the bicycle drive units 80 and 100 and connected to the bicycle component 54.

In each of the above embodiments and modified examples, the bicycle component 54 includes at least one of a shifting device, a seatpost assembly, a suspension, and a brake device but may include at least two of a shifting device, a seatpost assembly, a suspension, and a brake device. The bicycle component 54 can include two or more of the shifting device 68, a seatpost assembly, a suspension, and a brake device. In such a case, the drive unit 80 is provided with the wire operation devices 84, 110, and 130 in accordance with the number of the bicycle components 54. For example, one of the wire operation devices 84, 110, and 130 operates the shifting device 68, and another one of the wire operation devices 84, 110, and 130 operates the seatpost assembly. Preferably, a plurality of the operation units 70 operates the shifting device 68, the seatpost assembly, the suspension, and the brake device.

What is claimed is:

1. A bicycle drive unit comprising:
   a housing;
   a crankshaft rotatably supported by the housing with bearings, axial ends of the crankshaft being configured for crank arms of a bicycle to be coupled thereto;
   a motor that is supported by the housing and configured to assist propulsion of the bicycle, at least a portion of the motor being accommodated inside the housing;
   an output portion arranged to be driven by the motor, the output portion being configured to be coupled to a crank of the bicycle, the output portion being disposed coaxially with respect to the crankshaft; and
   a wire operation device that includes an electric actuator different from the motor, the wire operation device being accommodated inside the housing and configured to actuate the electric actuator to operate a wire that is connectable to a bicycle component,
   the housing including a hole configured and arranged for the wire to extend out of the housing through the hole.

2. The bicycle drive unit according to claim 1, wherein the wire operation device includes a wire connection portion that is connectable to the wire and rotated to operate the wire.

3. The bicycle drive unit according to claim 1, wherein the wire operation device includes a wire connection portion that is connectable to the wire and moved in a predetermined direction to operate the wire.

4. The bicycle drive unit according to claim 1, further comprising
   a guide that guides the wire and is provided inside the housing.

5. The bicycle drive unit according to claim 4, wherein the guide is one of a plurality of guides.

6. The bicycle drive unit according to claim 4, wherein the guide includes a groove provided on the housing.

7. The bicycle drive unit according to claim 4, wherein the guide includes a roller that is rotatable relative to the housing.

8. The bicycle drive unit according to claim 4, wherein the guide is arranged to guide the wire between the wire operating device and the hole, the guide including a pair of parallel elongated protrusions and a groove defined between the elongated protrusions, the groove being configured to accommodate the wire.

9. The bicycle drive unit according to claim 1, wherein the housing includes a frame connection portion that is connectable to a frame of the bicycle.

10. The bicycle drive unit according to claim 1, wherein the housing is configured to support a crankshaft of the bicycle.

11. The bicycle drive unit according to claim 10, wherein in a state in which the housing is provided on the bicycle, a wire connection portion of the wire operation device is located at a position separated from a center of the frame of the bicycle in a direction in which the crankshaft of the bicycle extends.

12. The drive unit according to claim 1, further comprising
   a detector that detects movement of the wire.

13. The bicycle drive unit according to claim 1, further comprising
   an electronic controller that controls the wire operation device.

14. The bicycle drive unit according to claim 13, wherein the electronic controller is configured to control the motor.

15. The bicycle drive unit according to claim 13, further comprising
   a communication unit that is configured to communicate with at least one of an operation device that is operable by a rider and a sensor that detects a condition of the bicycle, the electronic controller being configured to control the wire operation device in accordance with information input to the communication unit.

16. The bicycle drive unit according to claim 15, wherein the communication unit is configured to communicate with the at least one of the operation device and the sensor through wireless connection.

17. The bicycle drive unit according to claim 13, further comprising
   a memory device that stores information related to a movement amount of the wire that is required to perform a predetermined action with the bicycle component, and the electronic controller is configured to change the information related to the movement amount of the wire stored in the memory device in accordance with an operation of an external device.

18. The bicycle drive unit according to claim 13, wherein the electronic controller is configured to control the wire operation device to move the wire over a first movement amount in one of a first direction and a second direction that is opposite to the first direction, and the electronic controller is then configured to control the wire operation device to move the wire over a second movement amount, which is less than the first movement, in the other one of the first direction and the second direction.

19. The bicycle drive unit according to claim 13, wherein the electronic controller is configured control the wire operation device to move the wire over a first movement amount in one of a first direction and a second direction that is opposite to the first direction, and the electronic controller is then configured to control the wire operation device to move the wire over a second movement amount in the one of the first direction and the second direction.

20. A bicycle drive system comprising a bicycle drive unit according to claim 1; and further comprising
the wire, and the bicycle component, the bicycle component including at least one of a shifting device, a seatpost assembly, a suspension, and a brake device.

21. The bicycle drive unit according to claim 1, further comprising:
an attachment portion provided inside the housing, the attachment portion being configured for the wire operation device to be attachable thereto by at least one bolt.

22. The bicycle drive unit according to claim 21, wherein the attachment portion including at least one hole that is threaded and configured to receive the bolt.

23. A bicycle drive unit comprising:
a motor configured to assist propulsion of a bicycle;
a housing that supports the motor and in which at least a portion of the motor is accommodated;
a wire operation device configured to operate a wire that is connectable to a bicycle component, the wire operation device comprising a wire connection portion, an electric actuator, and a support that supports the wire connection portion and the electric actuator, the wire connection portion being rotatably supported by the support and the electric actuator being arranged to transmit a torque to rotate the wire connection portion; and
an attachment portion provided on the housing, the attachment portion being configured for the wire operation device to be attachable thereto by a plurality of bolts, and the attachment portion including a plurality of holes through which the plurality of bolts are inserted.

24. The bicycle drive unit according to claim 23, wherein the wire operation device is disposed outside the housing.

25. A bicycle drive unit comprising:
a motor configured to assist propulsion of a bicycle;
a housing that supports the motor and in which at least a portion of the motor is accommodated;
a wire operating device provided on the housing, the wire operating device being configured to operate an inner wire of a Bowden cable;
a holder provided on the housing, the holder being configured to hold an end of an outer cable of the Bowden cable, the holder having a through hole including a first hole and a second hole, the first hole having an inner diameter into which the outer cable is insertable and the second hole having a diameter smaller than the first hole; and
a guide provided on the housing in a position between the wire operating device and the holder, the guide including a pair of parallel elongated protrusions and a groove defined between the elongated protrusions, the guide being configured to contact a wire such that an extending direction of the wire is changed, the guide being configured to guide movement of the wire, the wire being connectable to a bicycle component.

* * * * *